United States Patent Office 3,386,922
Patented June 4, 1968

3,386,922
WET AIR OXIDATION OF COMBUSTIBLE MATERIALS ADSORBED ON CARBONACEOUS ADSORBENT
Eugene Wilhelm Schoeffel, Rothschild, and Frederick John Zimmermann, Wausau, Wis., assignors to Sterling Drug, Inc., New York, N.Y., a corporation of Delaware
No Drawing. Continuation-in-part of application Ser. No. 854,247, Nov. 20, 1959. This application Nov. 23, 1962, Ser. No. 239,790
4 Claims. (Cl. 252—416)

ABSTRACT OF THE DISCLOSURE

Regenerating spent carbonaceous adsorbent by suspending in water, and oxidizing with a gas containing free oxygen at a temperature of 125° C. to 300° C. and at a pressure sufficient to maintain a portion of said water in the liquid phase.

---

This application is a continuation-in-part of application Ser. No. 854,247, filed Nov. 20, 1959, now abandoned.

This invention relates to a process for the reclamation or regeneration of spent surface active adsorbents, e.g. charcoal which has been used for purification processes and has undesired oxidizable impurities adsorbed on its surfaces.

The invention resides in the concept of a process for the selective removal of oxidizable adsorbate from the surface of a spent comminuted porous surface active carbonaceous adsorbent, itself oxidizable, which comprises the steps of: introducing an aqueous dispersion of the said adsorbent and a gaseous oxidizing agent containing free oxygen, the amount of oxygen used being approximately that stoichiometrically required to oxidize the said adsorbate, into a reaction zone; maintaining the reaction zone at a temperature between about 125 degrees centigrade and the critical temperature of water under the vapor pressure of the reaction mixture at the temperature employed until the adsorbate is substantially completely oxidized to gaseous components; and, removing from the reaction zone an aqueous dispersion of the thus regenerated carbonaceous adsorbent.

A preferred aspect of the invention resides in the concept of a process for the selective removal of oxidizable adsorbate from the surface of a spent comminuted porous surface active carbonaceous adsorbent, itself oxidizable, which comprises the steps of: introducing an aqueous dispersion of the said adsorbent and a gaseous oxidizing agent containing free oxygen, the amount of oxygen used being approximately that stoichiometrically required to oxidize the said adsorbate, into a reaction zone; maintaining the reaction zone at a temperature between about 125 and 200 degrees centigrade under the vapor pressure of the reaction mixture at the temperature employed until the adsorbate is substantially completely oxidized to gaseous components; and, removing from the reaction zone an aqueous dispersion of the thus regenerated carbonaceous adsorbent.

Another aspect of the invention resides in the concept of a process for oxidizing combustible materials which comprises the steps of: concentrating said combustible materials by adsorbing them upon a comminuted porous surface active carbonaceous adsorbent, itself oxidizable; introducing an aqueous dispersion of the said adsorbent containing combustible materials adsorbed thereon and a gaseous oxidizing agent containing free oxygen, the amount of oxygen used being approximately that stoichiometrically required to oxidize the adsorbed combustible materials, into a reaction zone; maintaining the reaction zone at a temperature between about 125 degrees centigrade and the critical temperature of water under the vapor pressure of the reaction mixture at the temperature employed until the adsorbed combustible materials are substantially completely oxidized to gaseous components; and, removing from the reaction zone an aqueous dispersion of the said carbonaceous adsorbent substantially free from adsorbed combustible materials and suitable for reuse in the process.

Carbonaceous surface adsorbents such as lignin charcoal, bone charcoal, powdered coal, powdered coke, activated charcoal, activated carbon, and the like, are used for many purposes in many chemical industries, e.g. as adsorbents to obtain clarification, purification, and refinement of the desired finished products. In time, these materials become clogged with impurities and are "spent," so that they no longer adequately perform their adsorption function. In some operations, the spent adsorbent is discarded; in others, it is reused by a "countercurrent" application requiring also additional agent. Where the spent adsorbent has been used for the purification and separation of gases, it can sometimes be regenerated by sweeping the spent material with steam. However, where the spent material was used to adsorb substances from liquids, it can be regenerated only with difficulty, by a "kilning" process. Thus spent bone char from sugar refining is regenerated by being washed with hot water, dried with waste gas, and heated (in the absence of air) at 1000 to 1200 degrees Fahrenheit to volatilize organic substances still remaining after washing. Careful control of temperatures is necessary, and each time the spent material is regenerated some of its volume and activity is lost.

The present invention provides a convenient method for regenerating spent surface active adsorbents containing oxidizable or combustible materials. The spent surface active adsorbents in aqueous dispersion are subjected to a comparatively mild wet air oxidation at relatively low temperature and pressure conditions to selectively oxidize the adsorbed combustibles. The amount of oxygen employed is limited to approximately that amount stoichiometrically required to oxidize the adsorbed combustibles thereby controlling the oxidation process so that most of the adsorbent can be recovered intact and with a high degree of surface activity.

The combustibles adsorbed upon the surface active adsorbent may be organic or inorganic. If organic they will usually oxidize to form carbon dioxide, which is then vented from the reactor; and water or volatile acids such as acetic acid, i.e., products which are easily separated from the now "clean" surface active adsorbent. If inorganic they will usually oxidize to form gaseous products e.g. sulfur dioxide, or water soluble products or water insoluble solids e.g. calcium sulfate. Only the latter type presents any problem so far as separation of the oxidation products and the regenerated surface enlarging agent is concerned. This problem of separating solid non-water soluble oxidation products from the solid surface enlarging agent is easily solved by the use of conventional classification procedures, such as a classification separator, which separates materials on the basis of their different sizes and weights.

If the rejuvenated surface active adsorbent is to be used in an aqueous medium, it may be used without further treatment after it leaves the reaction zone wherein the selective wet air oxidation has occurred, since it will be present in the form of an aqueous dispersion. If the rejuvenated surface active adsorbent is to be used in any other liquid medium, then the water from the aqueous dispersion can be removed therefrom in any desired manner, e.g., by filtration, and then by treatment with the liquid in which the surface enlarging agent is to be used. If the rejuvenated surface active adsorbent is to be used in dry form, then the water from the aqueous dispersion must be removed and the resultant damp surface enlarging agent dried in any desired manner.

A related aspect of the present invention is to use the process to obtain greater efficiency in wet air oxidizing combustibles and to wet air oxidize combustibles at lower temperatures than could be used if the oxidized combustibles were not concentrated by and adsorbed upon any surface enlarging agent. In other words, the use of a surface active adsorbent, which is not itself to be oxidized, allows the wet air oxidation of the combustibles concentrated thereon to proceed under lower temperature conditions or improved oxidation efficiencies.

The apparatus required to conduct the inventive process is very simple, and requires only a pump to pump the aqueous dispersed slurries, an air compressor to supply air, heat exchangers, a reactor (essentially just a pressure vessel) and separation for the liquid and volatile constituents of the wet air oxidation, a filter or centrifuge, a classifier (if insoluble oxidation products are present), and if desired a belt conveyor system or equivalent means to return the regenerated material to where it is to be reused.

The process of the present invention involves the following: water is added to the spent surface active adsorbent to form an aqueous dispersion and this aqueous dispersion is then introduced into a reaction zone together with a free oxygen containing gas, usually air for reasons of economy. The amount of oxygen introduced in the reaction zone is that stoichometrically required to oxidize the combustibles adsorbed on the surface of the surface active adsorbent. This amount can easily be calculated by obtaining representative samples of the spent material and ascertaining the amount of adsorbed combustibles present thereon. The reaction zone is maintained at a temperature between 125 degrees centigrade and the critcial temperature of water. The pressure in the reaction zone is at least the vapor pressure of the reaction mixture and may be considerably higher since the water in the reaction zone must always be maintained at least partially in the liquid phase. In other words the water, which is introduced as the aqueous portion of the aqueous dispersion, must not be completely converted to steam. Within the reaction zone the adsorbed combustibles will be oxidized and converted to gaseous, liquid or solid materials which are easily separable from the now-clean surface active adsorbent, and the latter is removed from the reaction zone, still in the form of an aqueous dispersion. The process may be run as a continuous or a batch process.

It will be apparent that the process of the present invention has a great many advantages not found in prior art processes such as: (1) ease of handling of materials, since the surface active adsorbents are used in the form of an aqueous dispersion so they may be pumped from place to place, (2) continuous recycle is possible as in any process involving the use of materials in the form of aqueous dispersion rather than dry, (3) no necessity for kilning or drying since the oxidation occurs in the aqueous phase, (4) complete regeneration of spent surface active adsorbents so absorption ability is completely restored, (5) minimal losses of the surface active adsorbents during the regeneration procedure, (6) economics of equipment and operation which make regeneration desireable where heretofore it has been cheaper to supply new surface active adsorbents, (7) it can be used to remove any impurities adsorbed upon surface active adsorbents so long as these impurities are oxidizable to gaseous, liquid, water-soluble or solid products.

Examples of typical applications for the process of the present invention include the regeneration of surface active adsorbents used in the purification of dry cleaning liquids, oil refinery sludge, air scrubbers, smoke stack scrubbers, anti-polution unit operations involving gases, liquids or solids, et cetera.

The following comparative examples are offered to better illustrate the invention and to demonstrate the differences obtained by modifying the necessary conditions:

Example 1.—Wet air oxidation of charcoal alone

An aqueous dispersion of 50 grams of activated charcoal per liter of water and oxygen, in an amount 50 percent in excess of that required to convert all the charcoal to carbon dioxide, was charged into an agitated pressure reactor. The reactor was then heated for one hour at 150 degrees centigrade after which the amount of charcoal oxidized was determined by analysis of the carbon dioxide in the gaseous effluent. This experiment was repeated at temperatures of 175, 200 and 225 degrees centigrade with the following results:

| Reaction temperature in °C.: | Percent of starting carbon oxidized |
|---|---|
| 150 | 0.67 |
| 175 | 5.77 |
| 200 | 48.1 |
| 225 | 93.8 |

The above shows that charcoal alone is not generally affected by a wet air oxidation until the reaction is run at a temperature above about 185 degrees centigrade.

Example 2.—Wet air oxidation of charcoal having combustibles absorbed

An aqueous phenolic industrial waste effluent having a C.O.D. (chemical oxygen demand) of 1.8 grams per liter was treated with various amounts of powdered lignin charcoal. The following chart shows, on the left side, the grams of charcoal used per liter of waste effluent, in the middle portion shows the C.O.D. of the resultant effluent after the charcoal has absorbed the waste matter from the starting waste effluent, and on the right side the C.O.D. of the material absorbed by the charcoal per gram of charcoal.

| Charcoal Used, grams/liter | C.O.D. of Resultant Effluent in grams/liter | C.O.D. of Matter Absorbed on Charcoal |
|---|---|---|
| 0 | 1.80 | |
| 5 | 1.01 | 0.79 |
| 20 | 0.91 | 0.89 |
| 40 | 0.90 | 0.90 |
| 75 | 0.72 | 1.08 |
| 100 | 0.64 | 1.16 |
| 300 | 0.42 | 1.38 |

Thus the addition of 40 grams per liter of charcoal reduced the C.O.D. from 1.8 to 0.90. The addition of 300 grams per liter of charcoal reduced the C.O.D. from 1.8 to 0.42 grams per liter and cleared the effluent from an olive green, turbid, stinky effluent to a sparkling, odorless, water-white solution.

Each of the spent charcoal portions from the above chart was dispersed in sufficient water so that there was an aqueous dispersion of 50 grams of spent charcoal per liter of water. Each aqueous dispersion was charged into an agitated pressure reactor together with oxygen, the amount of oxygen in each case being that amount theoretically necessary to oxidize the absorbed matter on the charcoal. The pressure reactor was then heated for one hour at 200 degrees centigrade. The charcoal from each of the above portions was recovered from the reactors, dried and weighed. It was found that in each case about 90 percent of the starting amount of charcoal was recovered. Each of the recovered charcoal portions was then treated with the same starting industrial waste effluent, and in each case the amount of matter absorbed was substantially the same as in the above chart. This shows that the effectiveness of the original adsorption qualities of the charcoal was not impaired by the regeneration process and demonstrates that the spent material was effectively regenerated by this process.

This example also shows that, even at a temperature of about 200 degrees centigrade only about 10 percent of the charcoal having combustibles absorbed thereon was oxidized, whereas in Example 1, at 200 degrees centigrade, about 50 percent of the charcoal (containing no absorbed materials) was oxidized. Therefore, the process selectively oxidized the adsorbed material.

Example 3.—Wet air oxidation as a process for converting carbonaceous impurities to a surface active adsorbent Under some conditions the process may even be responsible for producing more surface active adsorbent than was originally introduced into the process. This may occur where the adsorbed impurities contain a high percentage of carbon. In other words, the recovery of activated adsorbent may be over 100 percent. The following example will illustrate this phenomena with a spent industrial charcoal.

(a) One liter of an aqueous slurry containing 200 grams of spent industrial charcoal having a total C.O.D. of 431.2 grams per liter was oxidized at 200 degrees centigrade for one hour. The impurities accounted for 30 percent of the C.O.D. or 129.3 grams per liter. Consequently the oxygen supplied to the reaction was 129.3 grams per liter. The percentage of activated adsorbent recovered based upon the weight of original adsorbent was 112.5 percent.

(b) The same experiment as 3(a) above was conducted at 225 degrees centigrade with a regeneration of 116 percent of the original starting adsorbent.

(c) The same experiment as 3(a) above was conducted at 300 degrees centigrade with a regeneration of 130 percent of the original starting adsorbent.

This illustrates that with certain impurities the process may be responsible for actually converting a portion of the impurity into a surface active adsorbent.

Example 4.—Wet air oxidation in presence of surface active agent (a) One liter of kraft black liquor having a C.O.D. of 143.59 grams per liter was charged into an agitated pressure reactor together with that amount of oxygen stoichiometrically required to oxidize all the oxidizables contained therein to carbon dioxide and water. The reactor was then heated at 150 degrees centigrade for one hour. The C.O.D. of the resultant liquor was 89.96 grams per liter indicating that some 62 percent of total oxidation had occurred.

(b) Three hundred grams of finely powdered lignin charcoal was added to one liter of kraft black liquor having a C.O.D. of 143.50 grams per liter and the admixture was charged into an agitated pressure reaction with the same amount of air as in Example 4(a) above, and the reactor was heated at 150 degrees centigrade for one hour. The C.O.D. of the resultant liquor was 32.10 grams per liter indicating that some 78 percent of total oxidation had occurred.

(c) The same reaction conditions as in 4(a) and 4(b) were repeated using one liter of the same strength kraft black liquor, to which had been added 300 grams of powdered coke. The C.O.D. of the resultant liquor was 79.20 grams per liter.

(d) The reaction conditions of 4(a), 4(b), and 4(c) were repeated using kraft black liquor to which had been added 300 grams of powdered coal. The C.O.D. of the resultant liquor was 52.40 grams per liter.

The above shows that even though each of the surface enlarging agents had the same fineness in powder form, lignin charcoal gave better results than coal, and the coal better results than the coke; and also, that all surface enlarging agents substantially increased the effectiveness of the wet air oxidation procedure.

Example 5.—Wet air oxidation in presence of surface active agent

In order to determine the effect of reduction of reaction temperature on the effectiveness of the oxidation, a waste liquid containing on oxidation an insoluble solid in the form of calcium sulfate and which had a C.O.D. of 115.75 grams per liter was used. Varying amounts of lignin charcoal were added to the waste liquid, which was then subjected to wet air oxidation at the temperatures indicated for one hour. The C.O.D. of the resultant liquor is shown. The results are recorded in the following chart.

| | Oxidation Temperature in Degrees Centigrade | Amount of Added Charcoal, grams/liter | C.O.D. of Resultant Liquor |
|---|---|---|---|
| 1 | 125 | None | 99.80 |
| 2 | 125 | 100 | 64.80 |
| 3 | 125 | 300 | 24.0 |
| 4 | 150 | None | 72.7 |
| 5 | 150 | 100 | 26.3 |
| 6 | 150 | 300 | 9.0 |
| 7 | 150 | 300 | 8.3 |

The seventh run recorded above used the regenerated charcoal from run number 6, and indicates the effectiveness of the regeneration procedure.

The above example shows, that even at an oxidation temperature as low as 125 degrees centigrade, if sufficient surface enlarging agent be added to the waste liquor to be oxidized, a relatively effective oxidation occurs. It also shows that the use of additional surface enlarging agent can counteract the effect of a lower oxidation temperature.

What is claimed is:

1. The process for the selective removal of oxidizable adsorbate from the surface of a spent comminuted porous surface active free carbon-containing carbonaceous adsorbent, itself oxidizable which comprises the steps of: introducing an aqueous dispersion of the said spent adsorbent and a gaseous oxidizing agent containing free oxygen, the amount of oxygen used being approximately that stoichiometrically required to oxidize the said adsorbate, into a reaction zone; maintaining the reaction zone at a temperature between about 125 degrees centigrade and 300 degrees centigrade and at a pressure which maintains a portion of the water of the aqueous dispersion in the liquid phase until the adsorbate is substantially completely oxidized to gaseous components; and, removing from the reaction zone an aqueous dispersion of the thus regenerated carbonaceous adsorbent.

2. A process according to claim 1 wherein the temperature is from 125 to 200 degrees centigrade.

3. A process according to claim 1 wherein the temperature is from 200 to 300 degrees centigrade.

4. A process according to claim 1 wherein the adsorbent is charcoal.

References Cited

UNITED STATES PATENTS

| 3,150,105 | 9/1964 | Ledding | 252—416 |
| 1,858,745 | 5/1932 | Mackert | 252—419 |
| 1,507,521 | 9/1924 | Russell | 252—416 |
| 1,771,719 | 7/1930 | Meyer | 252—420 |
| 2,665,249 | 1/1954 | Zimmermann | 210—2 |

MILTON WEISSMAN, *Primary Examiner.*

ROBERT D. EDMONDS, MAURICE A. BRINDISI, *Examiners.*

R. DAVIDSON, *Assistant Examiner.*